April 27, 1965 B. R. WANLASS 3,180,673
VEHICLE CLOSURE
Filed May 1, 1962 3 Sheets-Sheet 1

INVENTOR.
Bert R. Wanlass
BY
Herbert Furman
ATTORNEY

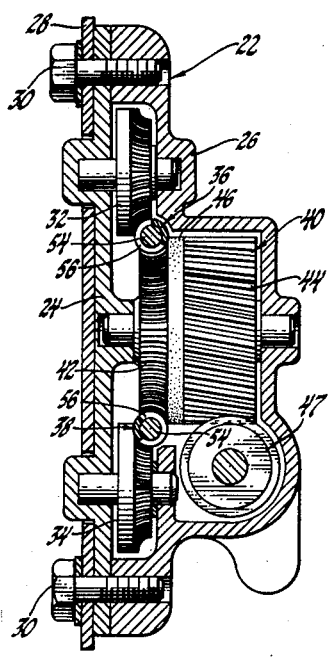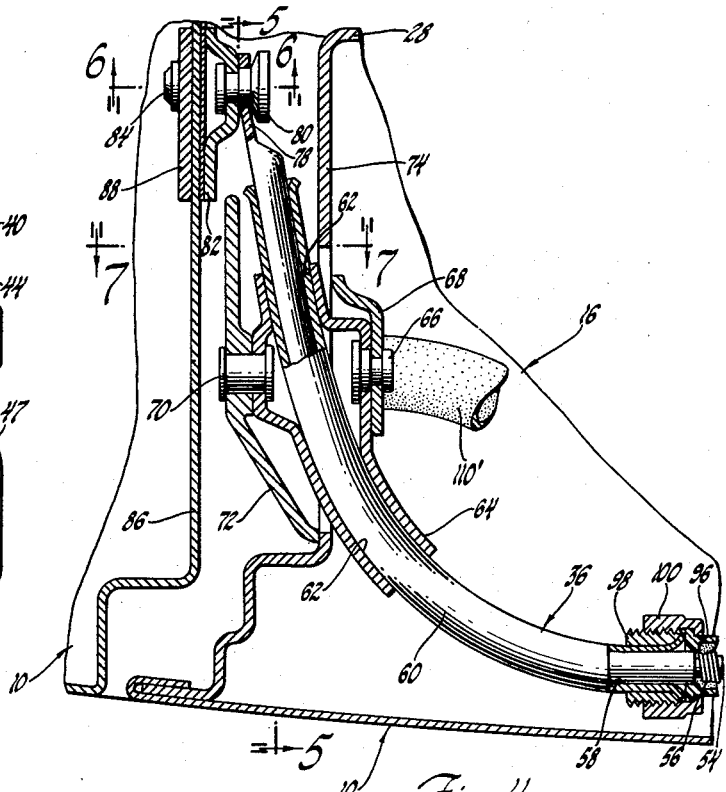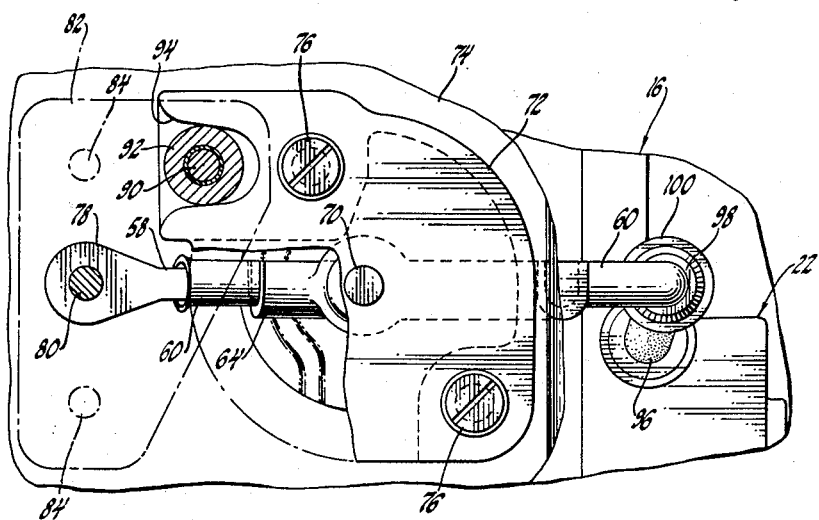
INVENTOR.
Bert R. Wanlass
BY
Herbert Furman
ATTORNEY April 27, 1965   B. R. WANLASS   3,180,673
VEHICLE CLOSURE
Filed May 1, 1962   3 Sheets-Sheet 3
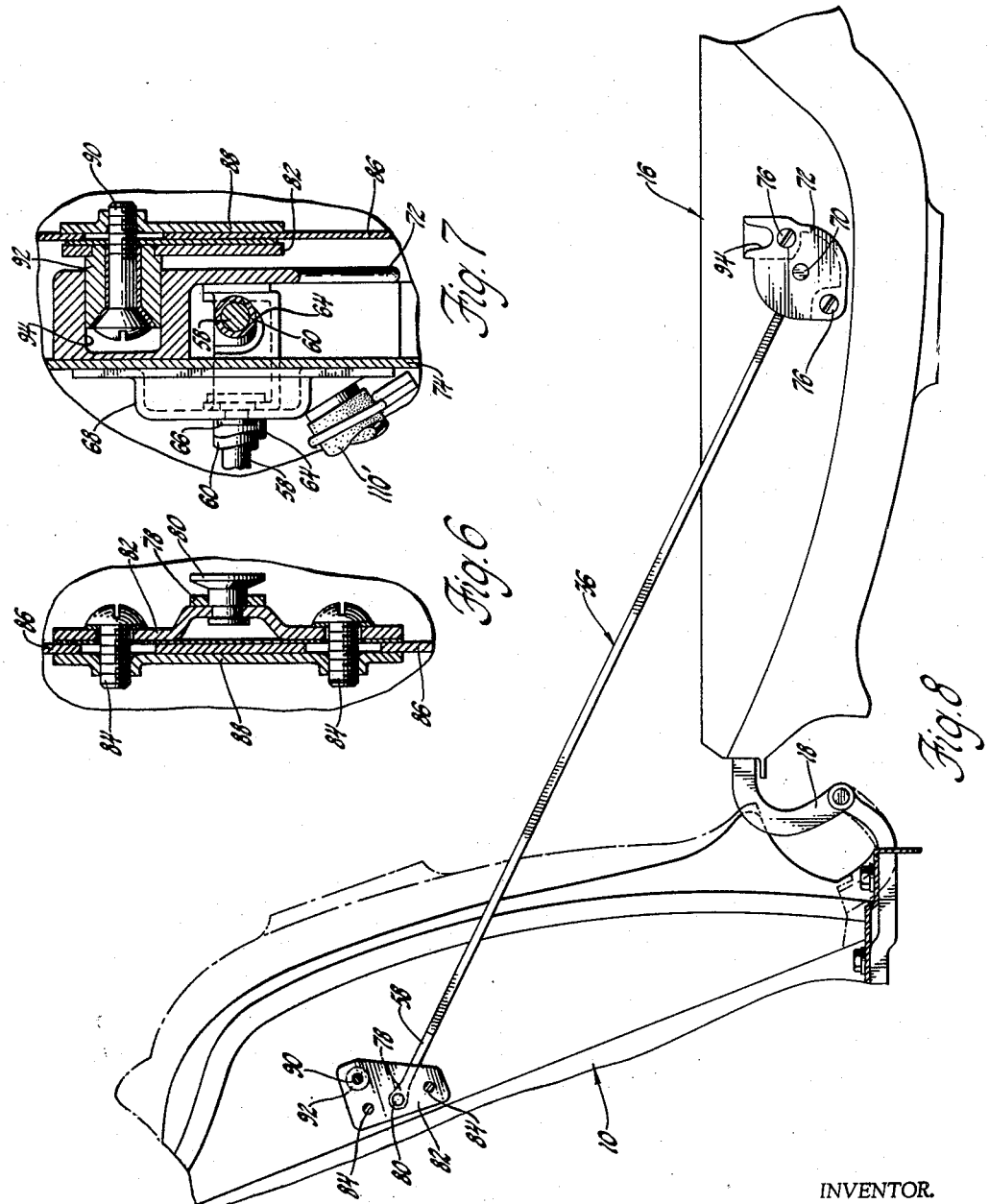
INVENTOR.
Bert R. Wanlass
BY
Herbert Furman
ATTORNEY

United States Patent Office
3,180,673
Patented Apr. 27, 1965

3,180,673
VEHICLE CLOSURE
Bert R. Wanlass, Warren, Mich., assignor to General Motors Corporation, Detroit, Mich., a corporation of Delaware
Filed May 1, 1962, Ser. No. 191,626
6 Claims. (Cl. 296—57)

This invention relates to vehicle closures and more particularly to an actuating means for a vehicle closure which moves the closure between open and closed positions as well as locates and holds the closure in each of its respective positions.

The actuating means of this invention, in its preferred embodiment, generally includes a pair of axially shiftable or push-pull flexible cable members, each having one end thereof secured to a body pillar side wall and extending inwardly into the vehicle closure. Each cable member has a portion thereof provided with a spirally wound wire member to provide a gear driven means for each of the members. A gear driving means provided within the interior of the closure generally comprises a driven gear located between and engageable with the gear driven means of each of the cable members, and idler gears located diametrically opposite to each other and to the driven gear to hold the flexible cable members in engagement therewith. Upon operation of a power operating means to operate the driven gear, the cable members are axially shifted or moved oppositely with respect to each other to either open or close the closure. The irreversibility of the driven gear and the idle gears in combination with the gear driven means of the cable members holds the closure in any open position thereof in the fully closed position thereof. Thus, no latching means are necessary to hold the closure in its closed position, and further, no strut or other similar type of locating means is required in order to hold and locate the closure in open position.

The primary object of this invention is to provide an improved actuating means for a vehicle closure. Another object of this invention is to provide an improved actuating means for a vehicle closure which includes a pair of oppositely movable cable members, each of which is anchored adjacent one end thereof to a vehicle body member and is movable both inwardly and outwardly of the closure to thereby move the closure between open and closed positions.

These and other objects of the invention will be readily apparent from the following specification and drawings, wherein:

FIGURE 3 is a sectional view taken generally along the plane indicated by line 3—3 of FIGURE 2;

FIGURE 4 is a partially broken away sectional view taken generally along the plane indicated by line 4—4 of FIGURE 2;

FIGURE 5 is a partial broken away view taken generally along the plane indicated by line 5—5 of FIGURE 4;

FIGURE 6 is a sectional view taken generally along the plane indicated by line 6—6 of FIGURE 4;

FIGURE 7 is a sectional view taken generally along the plane indicated by line 7—7 of FIGURE 4; and, FIGURE 8 is a view showing the tail gate in an open position.

Figure 1:
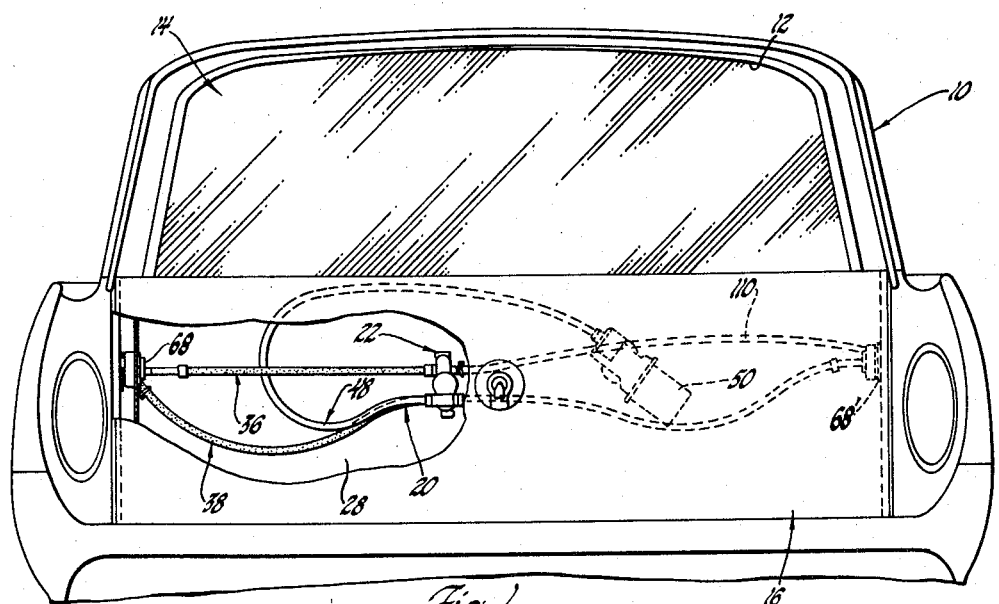
FIGURE 1 is a partially broken away partial rear elevational view of a station wagon type of body having a tail gate embodying actuating means according to this invention for moving the tail gate between open and closed positions.

Referring now particularly to FIGURE 1 of the drawings, a station wagon type of vehicle body 10 includes a rear opening 12, the upper portion of which is opened and closed by a vertically movable tail gate window 14 and the lower portion of which is opened and closed by a tail gate 16 which is swingably mounted on the body by suitable hinge means 18, FIGURE 8, for movement between a closed position as shown in FIGURE 1 and an open position as shown in FIGURE 8. Window 14 is mounted on the tail gate 16 by suitable window regulator mechanism for movement between a closed position as shown in FIGURE 1 and an open position, not shown, wherein window 14 is located within the tail gate 16. Tail gate 16 is moved between its opened and closed positions by actuating means 20 according to this invention which will now be described with reference to the remaining figures of the drawings.

Figure 2:
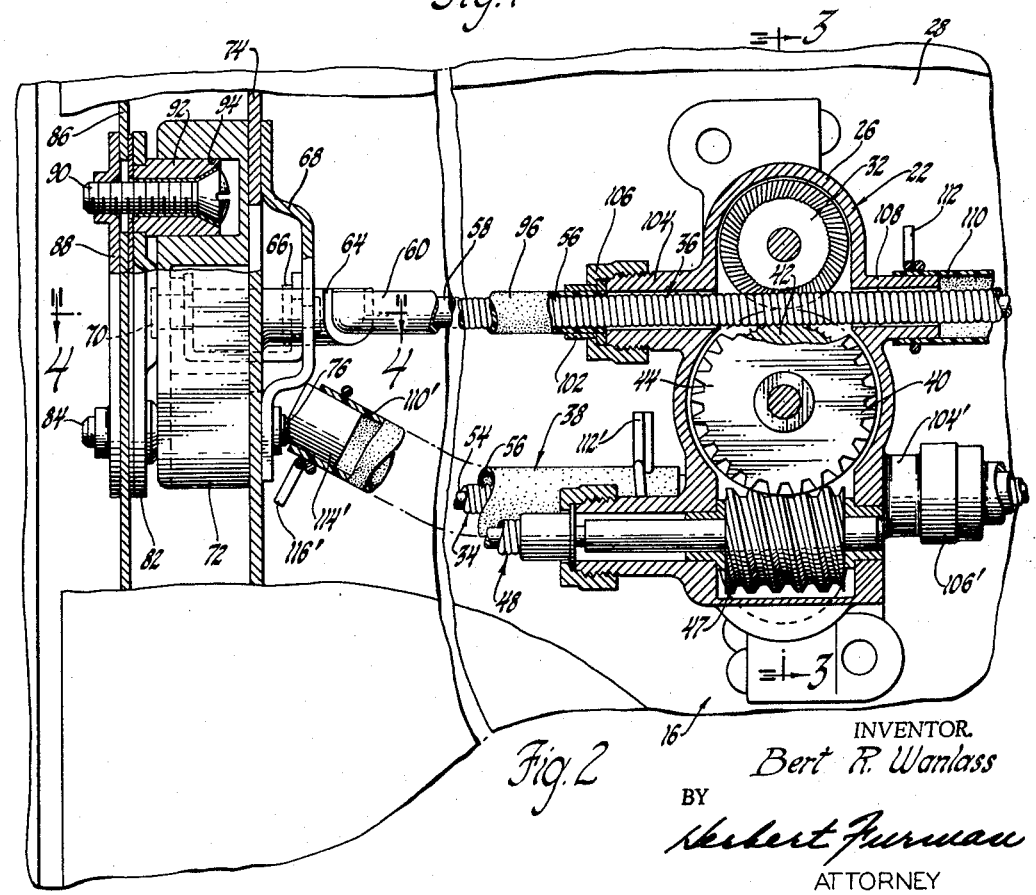
FIGURE 2 is an enlarged partially broken away view of a portion of FIGURE 1.

As shown in FIGURES 2 and 3, a housing 22 includes a base plate 24 and a cover plate 26 which are secured together and secured to the inner panel 28 of the tail gate 16 by bolts 30 extending into tapped openings of the cover plate 26. Upper and lower like idler gears 32 and 34 are supported within the housing 22 by having the stub shafts thereof journaled in oppositely located bosses of the base plate and of the cover plate. Gear 32 meshes with a cable assembly 36 and gear 34 meshes with a cable assembly 38, and it will be noted that the spiral teeth of each of the idler gears engage only a portion of the surface of each of the cable assemblies, approximately a quadrant thereof. A driven gear assembly 40 is also rotatably mounted within the housing 22 by having the stub shafts thereof journaled within bosses of the base plate and of the cover plate. Assembly 40 includes a spiral tooth gear 42 which meshes with a portion of the lower surface of the cable assembly 36 and a portion of the upper surface of the cable assembly 38, with the cable assemblies being held in engagement with gear 42 by means of the idler gears 32 and 34. Assembly 40 also includes a worm wheel 44 which is secured to gear 42 by means of an interposed rubber disc 46 bonded to each to provide a resilient drive and to further take up shock loads between the power operating means and the cable assemblies. Worm wheel 44 is driven by a worm 47 journaled in the cover plate 26 and driven by a flexible cable assembly 48 of known type which interconnects the worm 47 and an electric motor and reduction gear unit 50 of known construction which is suitably supported on the inner panel 28 of the tail gate 16.

The cable assemblies 36 and 38 are of like construction and each generally include a flexible wire core member 54 and an outer spirally wound thin wire member 56 secured thereto. The coils of member 56 provide a continuous spiral gear tooth which meshes with the teeth of the idler gears 32 and 34 and the gear 42. Inasmuch as the assemblies 36 and 38 are of like construction and like means are used to house the assemblies within the tail gate 14, to guide the assemblies as they move inwardly and outwardly of the tail gate 14, and to secure the assemblies to the pillar side walls of body 10, only cable assembly 36 will be specifically described and it will be understood that cable assembly 38 is of like construction.

As best shown in FIGURE 4, the outer end portion 58 of core member 54 is of larger diameter than the remaining major portion thereof and the wire member 56 which surrounds member 54 terminates immediately adjacent the outer end portion 58, with the O.D. of the outer end portion being approximately the same as that of the wire member 56. The portion 58 of the cable assembly is normally housed within a metal guide tube 60 which is releasably clamped at 62 between the opposite walls of a generally channel-shaped mounting bracket 64. An intermediate portion of bracket 64 is offset from the tube 60, with one wall of this intermediate portion being rotatably secured at 66 to a mounting bracket 68 and the other wall of this intermediate portion being rotatably secured at 70 to a boss of a hollow plate member 72. The plate member 72 is located outwardly of the pillar side wall 74 of the tail gate 16 and is held in place by the securing means 70 and also by means of bolts 76, FIGURE 5, extending through bosses of member 72 to secure the plate member to the bracket 68 which is located inwardly of the pillar side wall 74 of the tail gate.

The apertured flattened end 78 of portion 58 is rotatably mounted on a headed stud 80 which is secured to an offset portion of a bracket 82. Bracket 82 is bolted at 84 to the side wall pillar 86 of the body 10. The nut plate 88 which receives the bolt 84 mounts a headed stud 90, FIGURE 7, which rotatably mounts a roller 92. In the closed position of the tail gate 16, the roller 92 is received within a striker slot 94 provided in a boss of the member 72 so as to accurately locate the tail gate 16 in the closed position thereof.

As best shown in FIGURE 4, the inner flared end of tube 60 abuts the outer flanged end of a plastic conduit 96, with the tube and conduit being secured together in abutting relationship by a threaded nut 98 mounted on the tube 60 and a shouldered threaded cap 100 mounted on the conduit 96. The inner end of conduit 96 is secured to a flanged member 102 which is held in abutting relationship with a threaded boss 104 of housing 22 by means of a flanged threaded cap 106.

As best shown in FIGURE 2, the cable assembly 36 extends through housing 22 and a boss 108, coaxial with boss 104, into a plastic conduit 110 having the inner end thereof secured to boss 108 by a spring ring 112. The outer end of conduit 110 receives a plug, not shown, of the right-hand bracket 68' which is the same as the plug 114' of the left-hand bracket 68, being secured thereto by a spring ring which is the same as ring 116'.

The free end of the cable assembly 36 is housed within the conduit 110 and it will be noted that the conduit 110 together with the bosses 104 and 108 and the conduit 96 provide a guiding means for the cable assembly 36 to prevent any kinks or bends in the cable assembly when the assembly is shifted axially upon rotation of gear 42 and the meshing engagement of the teeth of this gear with the teeth provided by the wire member 56. The tube 60 is fixed with respect to the conduit 96 and is rotatably supported on the tail gate 16 by means of the bracket 64 and the pivotal connections of this bracket to the bracket 68 and the plate member 72. Thus, as the tail gate opens and closes and the angular relationship between the cable assembly 36 and the pillar side walls of the body and tail gate changes, the bracket 64 accommodates these changes.

When the electric motor and reduction gear unit 50 is operated to drive the worm 47 and the gear 42 in the appropriate direction, the cable assemblies 36 and 38 will each be axially shifted oppositely with respect to each other to push the tail gate 16 outwardly away from the body 10 toward its open position, as shown in FIGURE 8. During this movement of the tail gate, the cable assemblies 36 and 38 will move outwardly from the tubes 60, with the tubes 60 being able to accommodate the changing angles of the cable assemblies with respect to the pillar side walls 84 and 86 by means of the pivotal connections between the brackets 64 and both the brackets 68 and the members 72. In the open position of the tail gate, the irreversibility of the gear drive train, including the gear 42, the cable assemblies, and the idler gears 32 and 34, acts to hold the tail gate in this position against further opening movement. It is believed obvious from the foregoing description that movement of the gear 42 in an opposite direction will act to move the tail gate to closed position.

Thus, this invention provides an improved actuating means for a vehicle closure.

What is claimed is:
1. In a vehicle body having a closure mounted thereon for movement between open and closed positions and including opposite wall portions juxtaposed to opposite body wall portions in the closed position of said closure, the combination comprising a pair of nonrotatable flexible members located within said closure for axial movement relative thereto, means securing each of said members adjacent one end thereof to said body, guiding means guiding relative axial movement of each of said members into and out of said closure during said movement thereof, and operating means continuously engageable with successive portions of each of said members remote from said secured ends thereof to axially move said members relative to said closure and thereby move said closure between open and closed positions, said operating means being the anchoring means for said members on said closure to locate and hold said closure in said positions.

2. In a vehicle body having a closure mounted thereon for movement between open and closed positions and including opposite wall portions juxtaposed to opposite body wall portions in the closed position of said closure, the combination comprising, a pair of nonrotatable flexible members located within said closure for axial movement relative thereto, means securing each of said members adjacent one end thereof to said body, guiding means within said closure enclosing said members and guiding relative axial movement thereof into and out of said closure during said movement thereof, and operating means continuously engageable with successive portions of each of said members remote from said secured ends thereof to axially move said members relative to said closure and thereby move said closure between open and closed positions, said operating means being the anchoring means for said members on said closure to locate and hold said closure in said positions.

3. In a vehicle body having a closure mounted thereon for movement between open and closed positions and including opposite wall portions juxtaposed to opposite body wall portions in the closed position of said closure, the combination comprising, a pair of nonrotatable flexible members located within said closure for axial movement relative thereto, means pivotally securing each of said members adjacent one end thereof to a respective body wall portion, guiding means swingably mounted on said body wall portions and enclosing said members to guide relative axial movement thereof into and out of said closure during said movement thereof, and operating means continuously engageable with successive portions of each of said members remote from said secured ends thereof to axially move said members relative to said closure and thereby move said closure between open and closed positions, said operating means being the anchoring means for said members on said closure to locate and hold said closure in said positions, said guiding means swinging relative to said closure as said closure moves between said positions and said members swing relative to said body.

4. In a vehicle body having a closure pivotally mounted thereon for movement between open and closed positions and including opposite body wall portions juxtaposed to opposite body wall portions in the closed position of said closure, the combination comprising, a pair of nonrotatable flexible cables located within said closure for axial movement relative thereto, each including a core member and a member spirally wound on said core member to provide a continuous spiral tooth thereon, means pivotally securing each of said cables adjacent one end thereof to said body, guiding means guiding relative movement of each of said cables into and out of said closure during said movement thereof, and operating means for axially moving said cables relative to said closure to thereby move said closure between open and closed positions, said operating means being the anchoring means for said cables on said closure to locate and hold said closure in said positions and including a spirally toothed driving gear located between and drivingly engaging each of said cables and a spirally toothed idler gear holding each of said cables against said driving gear.

5. In a vehicle body having a closure pivotally mounted thereon for movement between open and closed positions and including opposite wall portions juxtaposed to opposite body wall portions in the closed position of said closure, the combination comprising, a pair of nonrotatable flexible cables located within said closure for axial movement relative thereto, each including a core member and a member spirally wound on said core member to provide a continuous spiral tooth thereon, means pivotally securing each of said cables adjacent one end thereof to said body, and operating means for axially moving said cables relative to said closure to thereby move said closure between open and closed positions, said operating means being the anchoring means for said cables on said closure to locate and hold said closure in said positions and including a spirally toothed driving gear located between and drivingly engaging each of said cables and a spirally toothed idler gear holding each of said cables against said driving gear, and guiding means guiding movement of each of said cables into and out of said closure during said movement thereof, said guiding means each including a rigid portion swingably mounted on one of said closure wall portions, a flexible portion connected to said rigid portion and to said operating means, and another portion connected between said operating means and the other of said closure wall portions.

6. In a vehicle body having a closure mounted thereon for movement between open and closed positions and including a wall portion juxtaposed to a body wall portion in the closed position of said closure, the combination comprising, a nonrotatable flexible member located within said closure for axial movement relative thereto, means securing said member adjacent one end thereof to said body, operating means continuously engageable with successive portions of said member remote from said secured end thereof to axially move said member relative to said closure and thereby move said closure between open and closed positions, said operating means being the anchoring means for said member on said closure to locate and hold said closure in said positions, and rigid guide means enclosing and guiding movement of said member into and out of said closure during said movement thereof, and being movably mounted on said closure wall portion to accommodate changes in the angular relationship between said member and said closure wall portion during movement of said closure between said positions thereof.

References Cited by the Examiner
UNITED STATES PATENTS

| 731,185 | 6/03 | Horst and Weber. | |
| 883,739 | 4/08 | Polk | 296—58 |
| 967,181 | 8/10 | Giermann | 296—59 |
| 1,157,128 | 10/15 | Sodt | 268—3 |
| 1,209,866 | 12/16 | Manville | 296—59 |
| 2,973,999 | 3/61 | Werner | 296—137 |
| 3,022,108 | 2/62 | Cooley | 296—57 |

PHILIP ARNOLD, *Primary Examiner.*

A. HARRY LEVY, *Examiner.*